(12) United States Patent
Christensen et al.

(10) Patent No.: US 7,805,766 B2
(45) Date of Patent: Sep. 28, 2010

(54) BROADCAST ROUTER HAVING A SHARED CONFIGURATION REPOSITORY

(75) Inventors: Carl L. Christensen, South Jordan, UT (US); Charles L. Johnson, Taylorsville, UT (US); Lynn Howard Arbuckle, Bountiful, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 1610 days.

(21) Appl. No.: 10/519,157

(22) PCT Filed: Jun. 13, 2003

(86) PCT No.: PCT/US03/19015

§ 371 (c)(1),
(2), (4) Date: Dec. 21, 2004

(87) PCT Pub. No.: WO04/002055

PCT Pub. Date: Dec. 31, 2003

(65) Prior Publication Data

US 2006/0155982 A1    Jul. 13, 2006

Related U.S. Application Data

(60) Provisional application No. 60/390,347, filed on Jun. 21, 2002.

(51) Int. Cl.
| | |
|---|---|
| G06F 15/16 | (2006.01) |
| G06F 9/00 | (2006.01) |
| G06F 12/14 | (2006.01) |
| G06F 3/00 | (2006.01) |
| G06F 13/00 | (2006.01) |
| G08B 29/00 | (2006.01) |
| H04L 29/06 | (2006.01) |

(52) U.S. Cl. ............... 726/34; 726/10; 713/1; 713/153; 713/165; 713/189; 710/8; 710/15; 710/104

(58) Field of Classification Search .................. 726/10, 726/34; 713/1, 153, 165, 189; 710/8, 15, 710/104
See application file for complete search history.

(56) References Cited

U.S. PATENT DOCUMENTS 5,537,607 A    7/1996    Ploger, III (Continued)

FOREIGN PATENT DOCUMENTS

KR    1999-004474    1/1999

(Continued)

OTHER PUBLICATIONS

Takahiro Murooka, et al., "Dynamic Reconfigurable Network Node", Technical Report of the IEICO, vol. 100, No. 534, pp. 9-15, Jan. 15, 2001, NTT Network Innovation Laboratories, Kanagawa, Japan.

(Continued)

Primary Examiner—Aravind K Moorthy
(74) Attorney, Agent, or Firm—Robert D. Shedd; Robert B. Levy

(57) ABSTRACT

A broadcast router includes plural input cards, first and second router matrix card and plural output cards. Programmable devices residing on the cards requiring configuration issue a request for configuration to a main controller which resides, with a shared configuration information repository on a configuration control card. After a period of time which allows additional programmable devices to request configuration elapses, the main controller polls the programmable devices residing on the cards to determine which of the programmable devices had requested configuration and, using the configuration information maintained in the shared configuration information repository, configures each programmable device which had requested configuration.

10 Claims, 5 Drawing Sheets

U.S. PATENT DOCUMENTS

| | | | |
|---|---|---|---|
| 5,550,984 | A | 8/1996 | Gelb |
| 5,628,028 | A | 5/1997 | Michelson |
| 5,659,684 | A | 8/1997 | Giovannoni et al. |
| 5,784,291 | A * | 7/1998 | Chen et al. ................... 716/10 |
| 5,845,132 | A * | 12/1998 | Walsh et al. ................ 710/260 |
| 5,852,370 | A * | 12/1998 | Ko .............................. 326/81 |
| 5,943,507 | A * | 8/1999 | Cornish et al. ............... 710/48 |
| 6,088,785 | A | 7/2000 | Hudson et al. |
| 6,185,641 | B1 * | 2/2001 | Dunnihoo ................... 710/56 |
| 6,453,278 | B1 * | 9/2002 | Favor et al. .................. 703/27 |
| 6,535,924 | B1 | 3/2003 | Kwok et al. |
| 2003/0101307 | A1 * | 5/2003 | Gemelli et al. ............. 710/305 |
| 2003/0110306 | A1 * | 6/2003 | Bailis et al. ................. 709/253 |

FOREIGN PATENT DOCUMENTS

KR      2001-0056663      7/2001

OTHER PUBLICATIONS

Ambardar et al. "Dynamic Router Configuration Management for Wireless Mobile Environments", The MITRE Corp. 1998, whole document.

Anonymous, "Nortel Networks Introduces Free On-Line Configuration and Management Tools for Improving Efficiency and Easing Deployment of Large Router Networks", PR Newswire, Apr. 1999; whole document Not Available.

Search Report Dated Sep. 3, 2003.

* cited by examiner

BROADCAST ROUTER HAVING A SHARED CONFIGURATION REPOSITORY

CROSS REFERENCE

This application claims the benefit, under 35 U.S.C. §365 of International Application PCT/US03/19015, filed Jun. 13, 2003, which was published in accordance with PCT Article 21 (2) on Dec. 31, 2003 in English and which claims the benefit of U.S. provisional patent application No. 60/390,347, filed Jun. 21, 2002.

FIELD OF THE INVENTION

The present invention relates to programmable devices and, more particularly, to a system having plural cards, each having one or more programmable device configurable using a shared configuration repository.

BACKGROUND OF THE INVENTION

A broadcast router allows each one of a plurality of outputs therefrom to be assigned the signal from any one of a plurality of inputs thereto. For example, an N×M broadcast router has N inputs and M outputs coupled together by a router matrix which allows any one of the N inputs to be applied to each one of the M outputs. Many such broadcast routers, in particular, the larger broadcast routers, are comprised of a single chassis which houses plural printed circuit boards, commonly referred to as "cards", interconnected in a wide variety of configurations. Oftentimes, many of the cards housed within a broadcast router are replicas of other cards housed within that same broadcast router. For example, in co-pending U.S. patent application Ser. No. 60/374,976 and previously incorporated by reference, a 1280×1280 broadcast router was disclosed which, when constructed, requires the use of 40 identically configured input cards, each having 32 inputs per card.

Typically, one or more field programmable gate arrays (or "FPGAs") reside on such cards. An FPGA is an integrated circuit that can be programmed in the field after manufacture. When a card, for example, the aforementioned input card, carrying one or more FPGAs is powered, for example, by power-up a broadcast router in which the card had been installed or by inserting (or "hot-plugging") the card into a slot in an input/output (or "I/O") bus of the broadcast router after power-up, the FPGAs residing on that card must be configured. Traditionally, FPGAs have been configured by a storage device, for example, a programmable read only memory (or "PROM"), which resides with the FPGA on that card. However, configuring FPGAs in this manner causes the requisite configuration circuitry and data storage devices to be replicated on each card carrying FPGAs or other programmable devices requiring configuration. Such configuration techniques can prove expensive, particularly for broadcast routers or other systems which include multiple cards on which devices requiring configuration reside.

SUMMARY OF THE INVENTION

An electronic system includes plural function cards, each having at least one programmable device residing thereon. The electronic system further includes a configuration control card, coupled to each one of the plural function cards, for configuring the programmable devices residing on the plural function cards. In one aspect of the invention, a memory device residing on the configuration control card functions as a shared configuration information repository for maintaining configuration information for use when configuring the programmable devices residing on the plural function cards. In another, configuration of the programmable devices residing on one of the function cards is controlled by a main controller residing on the configuration control card and a peripheral controller residing on the function card. In this aspect, the peripheral controller attends to forwarding requests for configuration originated by a programmable device to the main controller. In turn, the main controller retrieves configuration information from the memory subsystem and forwards the retrieved information to the peripheral controller. The peripheral controller then attends to forwarding the received configuration information to the requesting programmable device.

In further embodiments of the invention, the electronic system is a broadcast router, the plural function cards may include input cards, output cards and/or router cards of the broadcast router, and the programmable device may be a FPGA.

DETAILED DESCRIPTION

Figure 1:
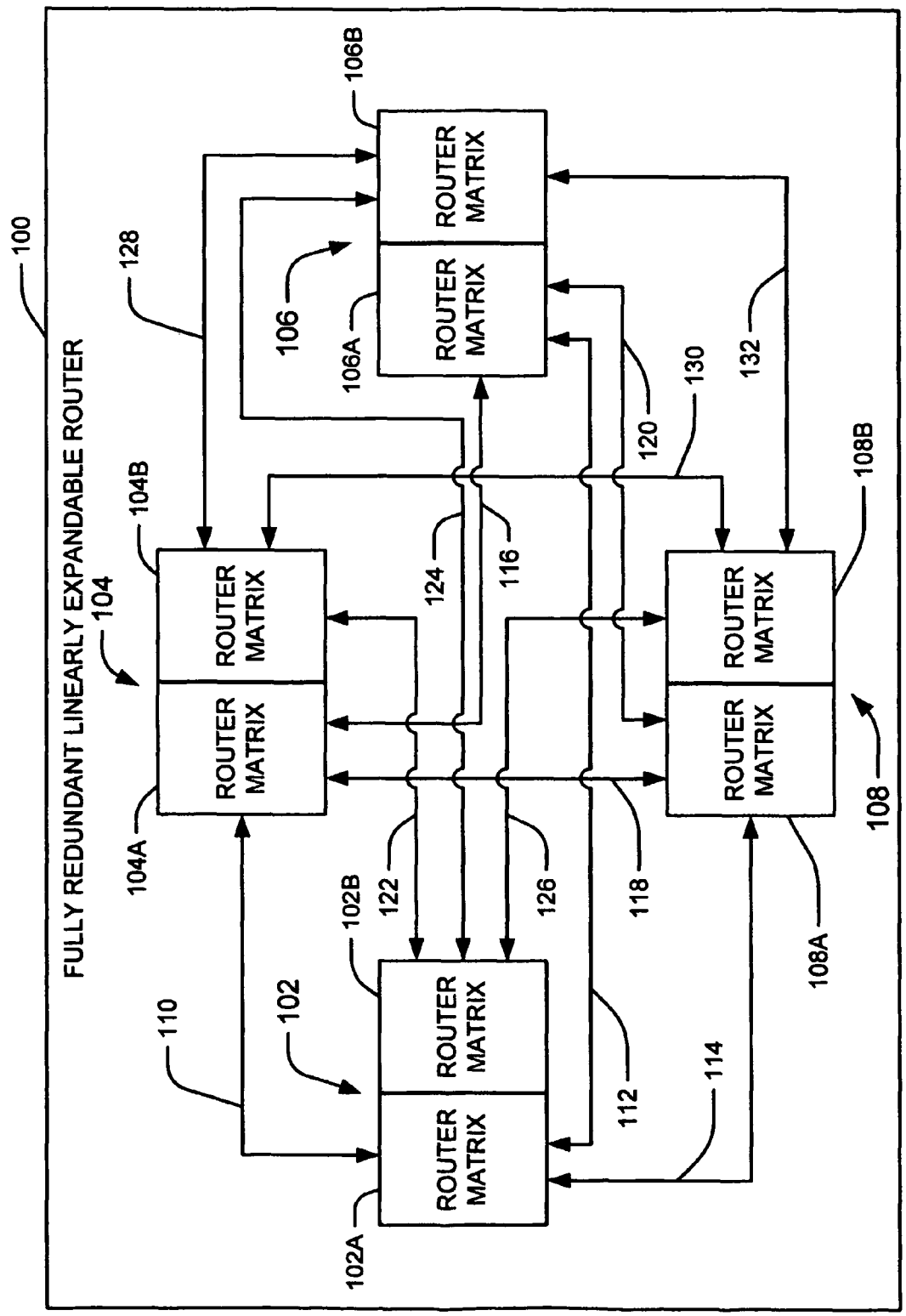
FIG. 1 is a block diagram of a fully redundant, linear expandable broadcast router.

Referring first to FIG. 1, a fully redundant, linearly expandable broadcast router 100 will now be described in greater detail. As may now be seen, the fully redundant, linearly expandable broadcast router 100 is comprised of plural broadcast router components coupled to one another to form the larger fully redundant linearly expandable broadcast router 100. Each broadcast router component is a discrete router device which includes first and second router matrices, the second router matrix being redundant of the first router matrix. Thus, each broadcast router has first and second routing engines, one for each of the first and second router matrices, each receiving, at an input side thereof, the same input digital audio data streams and placing, at an output side thereof, the same output digital audio data streams. As disclosed herein, each of the broadcast router components used to construct the fully redundant, linearly expandable broadcast router are N×M sized broadcast routers. However, it is fully contemplated that the fully redundant, linearly expandable broadcast router 100 could instead be constructed of broadcast router components of different sizes relative to one another.

As further disclosed herein, the fully redundant, linearly expandable broadcast router 100 is formed by coupling together first, second, third and fourth broadcast router components 102, 104, 106 and 108. Of course, the present disclosure of the fully redundant, linearly expandable broadcast router 100 as being formed of four broadcast router components is purely by way of example. Accordingly, it should be clearly understood that a fully redundant, linearly expandable broadcast router constructed in accordance with the teachings of the present invention may be formed using various other numbers of broadcast router components. The first, second, third and fourth broadcast router components 102, 104, 106 and 108 which, when fully connected in the manner disclosed herein, collectively form the fully redundant, linearly expandable broadcast router 100, may either be housed together in a common chassis as illustrated in FIG. 1 or, if desired, housed in separate chassis. While, as previously set forth, the broadcast router components 102, 104, 106 and 108 may have different sizes relative to one another or, in the alternative, may all have the same N×M size, one size that has proven suitable for the uses contemplated herein is 256×256. Furthermore, a suitable configuration for the fully redundant, linear expandable broadcast router 100 would be to couple five broadcast router components, each sized at 256×256, thereby resulting in a 1,280×1,280 broadcast router.

The first broadcast router component 102 is comprised of a first router matrix 102a and a second (or "redundant") router matrix 102b used to replace the first router matrix 102a in the event of a failure thereof. Similarly, each one of the second, third and fourth broadcast router components 104, 106, and 108 of the fully redundant, linearly expandable broadcast router 100 are comprised of a first router matrix 104a, 106a and 108a, respectively, and a second, redundant, router matrix 104b, 106b and 108b, respectively, used to replace the first router matrix 104a, 106a and 108a, respectively, in the event of a failure thereof. Of course, the designation of the second router matrices 102b, 104b, 106b and 108b as a redundant matrix for use as a backup for the first router matrices 102a, 104a, 106a and 108a, respectively, in the event of a failure thereof is purely arbitrary and it is fully contemplated that either one of a router matrix pair residing within a broadcast router component may act as a backup for the other of the router matrix pair residing within that broadcast router component.

As may be further seen in FIG. 1, the first router matrix 102a of the first broadcast router component 102, the first router matrix 104a of the second broadcast router component 104, the first router matrix 106a of the third broadcast router component 106 and the first router matrix 108a of the fourth broadcast router component 108 are coupled together in a first arrangement of router matrices which conforms to a fully connected topology. Similarly, the second router matrix 102b of the first broadcast router component 102, the second router matrix 104b of the second broadcast router component 104, the second router matrix 106b of the third broadcast router component 106 and the second router matrix 108b of the fourth broadcast router component 108 are coupled together in a second arrangement which, like the first arrangement, conforms to a fully connected topology. In a fully connected topology, each router matrix of an arrangement of router matrices is coupled, by a discrete link, to each and every other router matrix forming part of the arrangement of router matrices.

Thus, for the first arrangement of router matrices, first, second and third bi-directional links 110, 112 and 114 couples the first router matrix 102a of the first broadcast router component 102 to the first router matrix 104a of the second broadcast router component 104, the first router matrix 106a of the third broadcast router component 106 and the first router matrix 108a of the fourth broadcast router component 108, respectively. Additionally, fourth and fifth bi-directional links 116 and 118 couple the first router matrix 104a of the second broadcast router component 104 to the first router matrix 106a of the third broadcast router component 106 and the first router matrix 108a of the fourth broadcast router component 108, respectively. Finally, a sixth bi-directional link 120 couples the first router matrix 106a of the third broadcast router component 106 to the first router matrix 108a of the fourth broadcast router component 108.

Similarly, for the second arrangement of router matrices, first, second and third bi-directional links 122, 124 and 126 couples the second router matrix 102b of the first broadcast router component 102 to the second router matrix 104b of the second broadcast router component 104, the second router matrix 106b of the third broadcast router component 106 and the second router matrix 108b of the fourth broadcast router component 108, respectively. Additionally, fourth and fifth bi-directional links 128 and 130 couple the second router matrix 104b of the second broadcast router component 104 to the second router matrix 106b of the third broadcast router component 106 and the second router matrix 108b of the fourth broadcast router component 108, respectively. Finally, a sixth bi-directional link 132 couples the second router matrix 106b of the third broadcast router component 106 to the second router matrix 108b of the fourth broadcast router component 108.

Figure 2:
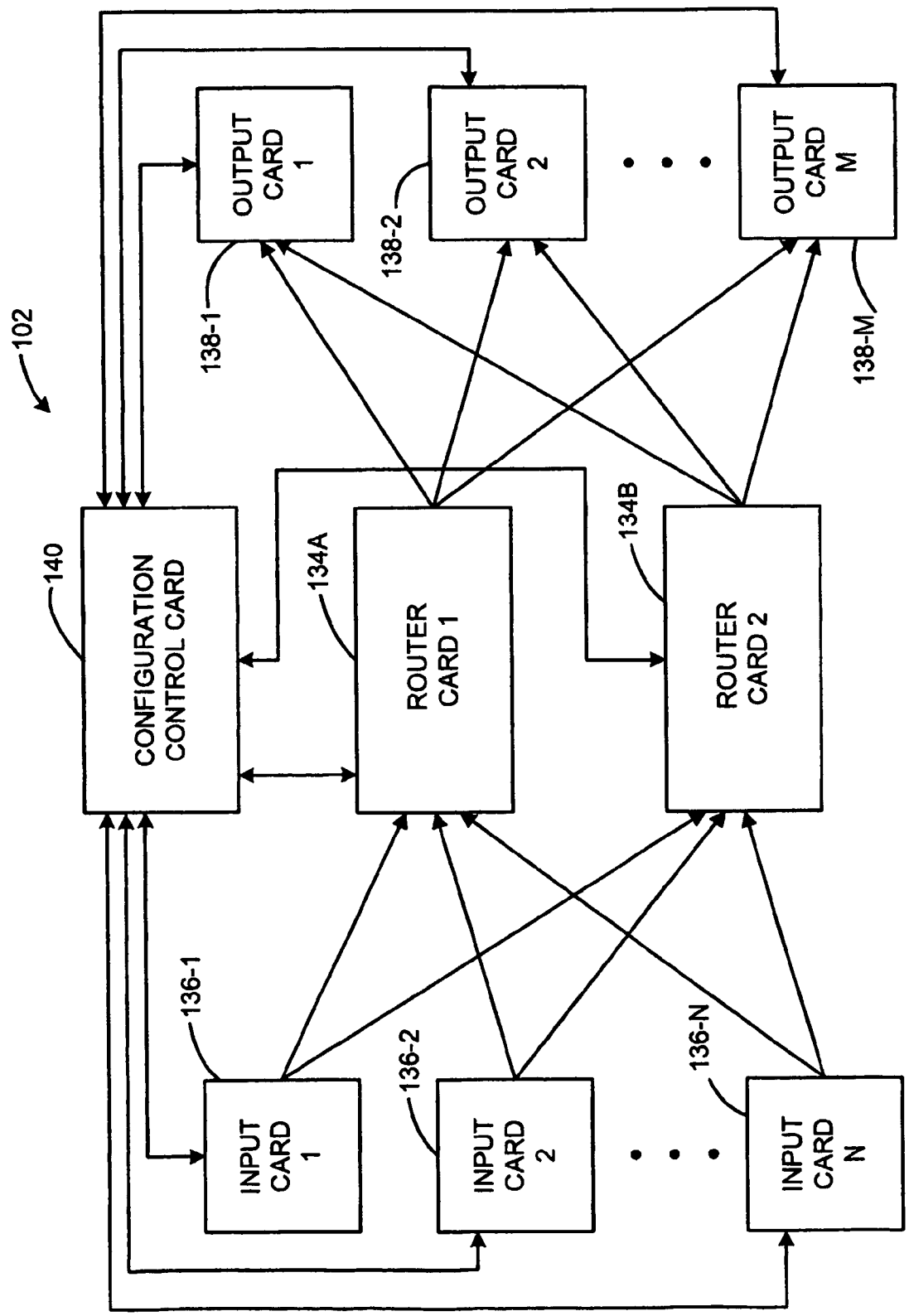
FIG. 2 is an expanded block diagram of a first broadcast router component of the fully redundant, linearly expandable broadcast router of FIG. 1.

The broadcast router components 102, 104, 106 and 108 will now be described in greater detail. FIG. 2 shows the first broadcast router component 102. The second, third and fourth broadcast router components 104, 106 and 108, on the other hand, are similarly configured to the first broadcast router component 102. Accordingly, the second, third and fourth broadcast router components 104, 106 and 108 need not be described in greater detail. It should be noted that, in the description that follows, the inputs to the first broadcast router component 102 which originate at the second, third and fourth broadcast router components 104, 106 and 108 have been omitted for ease of description. Further details of such inputs are discussed in co-pending U.S. patent application Ser. No. 60/374976 and previously incorporated by reference.

As may now be seen, the first broadcast router component 102 includes a first router matrix card 134a and a second router matrix card 134b identically configured to the first router matrix card 134a. The first and second router matrix cards 134a and 134b are each slideably received within and supportably mounted by a chassis (not shown) of the broadcast router 100. Of course, while it is not necessary to use plural router matrix cards when practicing certain aspects of the invention disclosed herein, the use of plural router matrix cards is generally preferred since it facilitates the continued proper operation of the broadcast router 100, as well as the repair and/or replacement of a failed router matrix card, without disturbing a properly functioning router matrix card.

Also slideably received within and supportably mounted by the chassis are input cards 136-1 through 136-N and output cards 138-1 through 138-M. Each input card 136-1 through 136-N is coupled to the first router matrix card 134a and the second router matrix card 134b. Likewise, each output card 138-1 through 138-M is coupled to the first router matrix card 134a and the second router matrix card 138b. Of course, while discrete input and output cards 136-1 through 136-N and 138-1 through 138-M are shown in FIG. 2, it should be clearly understood that, if desired, the functionality residing on both the input and output cards card, for example, the input card 136-1 and the output card 138-1 may instead be placed on a single I/O card. Furthermore, while FIG. 1 shows discrete input and output cards 136-1 through 136-N and 138-1 through 138-N, it is fully contemplated that, depending on available space thereon, all or part of the functionality shown as residing on either the input cards, for example, the input card 136-1, the output cards, for example, the output card 138-1, or both, may instead reside on the first router matrix card 134a, the second router matrix card 134b or some combination thereof.

Residing on each input card 136-1 through 136-N is input signal selection circuitry (not shown). The input signal selection circuitry 123 selects, from plural input signals received thereby, an input signal to be passed to both the first router matrix card 122*a* and the second router matrix card 122*b*. As disclosed herein, each one of the first and second router cards 134*a* and 134*b* receives one of N input digital audio data streams from each one of the input cards 136-1 through 136-N. Of course, such a configuration is purely exemplary and it is fully contemplated that plural ones of the N input digital audio data streams may be received from a single one of the input cards 136-1 through 136-N. Additionally, each one of the N input digital audio data streams are routed to both the first router card and the second router card of each one of the second, third and fourth broadcast router components 104, 106 and 108. Similarly, each one of the first and second router cards 134*a* and 134*b* receive input digital audio data streams N+1 through 2N, 2N+1 through 3N and 3N+1 through 4N from the second, third and fourth broadcast router component 104, 106 and 108, respectively. In this manner, both the first router matrix card 134*a* and the second router matrix card 134*b* receive the same 4N inputs.

Functionality residing on each one of the first and second router matrix cards 134*a* and 134*b* allows each one of the M outputs therefrom to be connected to a selected one of the 4N inputs thereto. Selection of the particular one of the 4N inputs to which each one of the M outputs is connected is controlled by control circuitry (not shown). The first and second router matrix cards 134*a* and 134*b* are identically controlled so that the M output digital audio data streams for the first router matrix card 134*a* are the same as the M output digital audio data streams for the second router matrix card 134*b*. From the first and second router matrix cards 134*a* and 134*b*, each one of the M output digital audio data streams is propagated to a corresponding one of the output cards 138-1 through 138-M. Residing on each one of the output cards 138-1 through 138-M is output signal selection circuitry (not shown) which selects, from a first output digital audio data stream received from the first router matrix card 134*a* and a second output digital audio data stream received from the second router matrix card 134*b*, a digital audio data stream to be output the first broadcast router component 102.

As will be more fully described below, each one of the input cards 136-1 through 136-N, the first router matrix card 134*a*, the second router matrix card 134*b* and each one of the output cards 138-1 through 138-M includes one or more programmable devices, for example, FPGAs, requiring configuration whenever powered, for example, whenever the broadcast router 100 is powered-up or whenever the card on which the programmable device resides is hot-plugged into the I/O bus of the broadcast router 100. A configuration control card 140 coupled to each one of the input cards 136-1 through 136-N, the first router matrix card 134*a*, the second router matrix card 134*b* and each one of the output cards 138-1 through 138-M provides configuration information to the FPGAs or other programmable devices residing thereon. Like the input cards 136-1 through 136-N, the first router matrix card 134*a*, the second router matrix card 134*b* and the output cards 138-1 through 138-M, the configuration control card 140 is slideably received within and supportably mounted by the chassis of the first broadcast router component 102.

Of course, FPGAs are just one type of programmable device requiring configuration information upon powering up and it is fully contemplated that other types of programmable devices which require configuration information may reside on one or more of the input cards 136-1 through 136-N, the first router matrix card 134*a*, the second router matrix card 134*b* and/or one or more of the output cards 138-1 through 138-M in place of, or together with, the FPGAs. Similarly, while FIG. 2 shows three types of cards—input cards, router matrix cards and output cards coupled to the configuration control card 140 to receive configuration information therefrom, it is fully contemplated that a wide variety of cards on which one or more FPGAs or other programmable devices reside may be coupled to receive configuration information from the configuration control card 140. Furthermore, while FIG. 2 shows all of the illustrated types of cards as being coupled to the configuration control card 140 to receive configuration information therefrom, it is contemplated that one or more of the illustrated types of cards may either not require configuration information or, in the alternative, may not be coupled to receive configuration information from the configuration control card 140. Finally, while FIG. 2 shows a special purpose card, specifically, the configuration control card 140, for configuring the programmable devices residing on the input cards 136-1 through 136-N, the first router matrix card 134*a*, the second router matrix card 134*b* and the output cards 138-1 through 138-M, it should be clearly understood that the functionality necessary to configure the programmable devices residing on the input cards 136-1 through 136-N, the first router matrix card 134*a*, the second router matrix card 134*b* and the output cards 138-1 through 138-M may instead reside on a multi-function card, for example, a card that performs other control functions on behalf of the broadcast router component 102.

Figure 3:
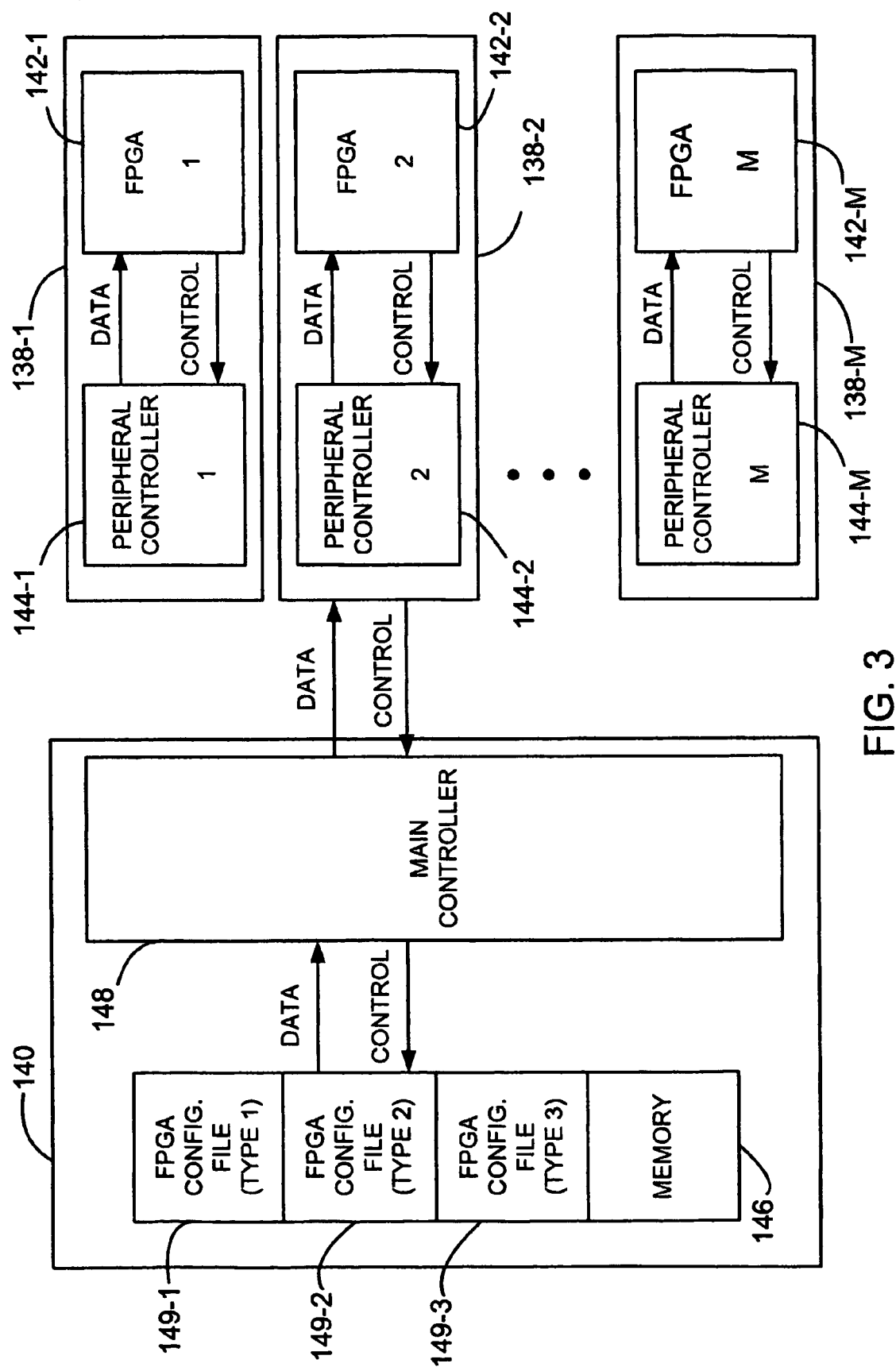
FIG. 3 is an expanded block diagram of a portion of the first broadcast router component of FIG. 2.

Referring next to FIG. 3, the interconnection between the configuration control card 140 and the output cards 138-1 through 138-M will now be described in greater detail. While, in FIG. 3, additional components of both the configuration control card 140 and the output cards 138-1 through 138-M may now be seen, it should be clearly understood that FIG. 3 has been greatly simplified and that various components of both the configuration control card 140 and the output cards 138-1 through 138-M not necessary to an understanding of the present invention have been omitted for ease of description. It should be further understood that, while not illustrated in FIG. 3, each one of the input cards 136-1 through 136-N, the first router matrix card 134*a* and the second router matrix card 134*b*: (1) have the same additional components shown in FIG. 3 as residing on each output card 138-1 through 138-M residing thereon; (2) are similarly interconnected with the configuration control card 140; and (3) are configured in the similar manner.

As may now be seen, residing on each one of the output cards 138-1 through 138-M is an FPGA 142-1 through 142-M and a peripheral controller 144-1 through 144-M coupled to the FPGA 142-1 through 142-M. Residing on the configuration control card 140, on the other hand, is a memory 146 which acts as a shared repository for the configuration information for each one of the FPGAs 142-1 through 142-M and a main controller 148 coupled to the memory 146. Finally, the main controller 148 is coupled to each one of the peripheral controllers 144-1 through 144-M. As will be more fully described below, the aforementioned links between the FPGAs 142-1 through 142-M, the peripheral controllers 144-1 through 144-M, the main controller 148 and the memory 146 are used to enable the flow of configuration information from the memory 146 to the FPGAs 142-1 through 142-M in response to control signals which flow from the FPGAs 142-1 through 142-M to the memory 146. It should be noted, however, that while FIG. 3 shows a series of discrete peripheral controllers 144-1 through 144-M, one corresponding to each of the FPGAs 142-1 through 142-M, it is fully contemplated that the functionality residing within each one of the peripheral controllers may instead be placed within the corresponding FPGA. Of course, in such a configuration, each one of the FPGAs 142-1 through 142-M would be directly coupled to the main controller 148. Further, the FPGAs 142-1 through 142-M would perform those functions hereinbelow described as being performed by the peripheral controllers 144-1 through 144-M.

The memory 146 is divided into plural areas, each of which holds configuration information for a type of programmable device is maintained. In FIG. 3, the memory 146 includes a first area 149-1 in which information necessary to configure a first type of device, for example, programmable devices residing on the output boards 138-1 through 138-M is maintained, a second area 149-2 in which information necessary to configure a second type of device, for example, programmable devices residing on the input boards 136-1 through 136-N, is maintained and a third area 149-3 in which information necessary to configure a third type of device, for example, the first and second router matrix cards 134a and 134b, is maintained. Preferably, the configuration information maintained in the memory 146 is programmed into the memory 146 via a JTAG port or another programming port, typically before the memory 146 is soldered to the configuration control card 140. Of course, while FIG. 3 shows the plural types of programmable devices for which the memory 146 holds configuration information may be distinguished from one another based upon the type of board on which the programmable device resides, it should be clearly understood that it is further contemplated that plural types of programmable devices may instead reside on a single type of board.

Figure 4A:
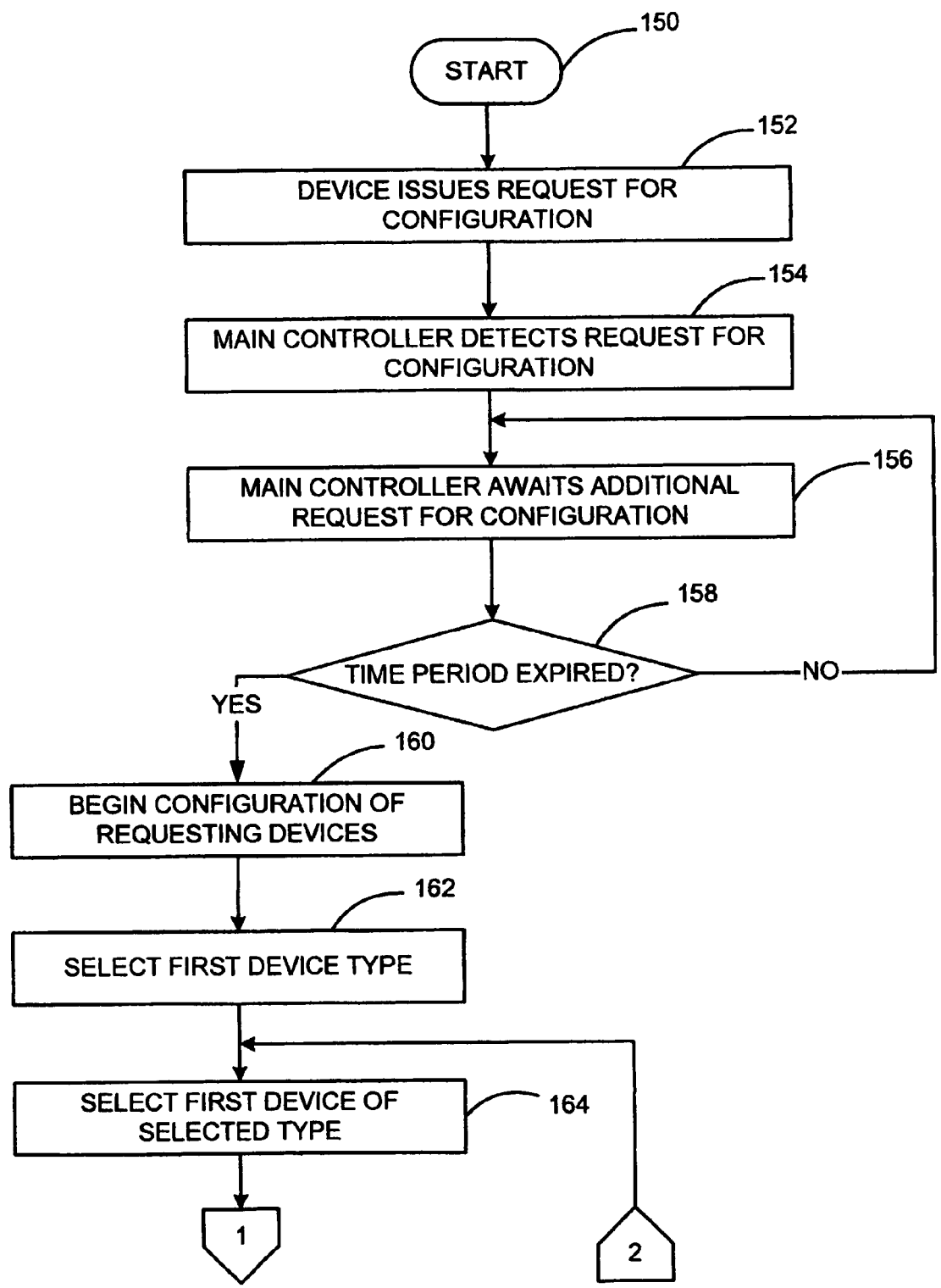
FIG. 4 is a flowchart of a method of configuring programmable devices residing within the first broadcast router component of FIG. 2.
Figure 4B:
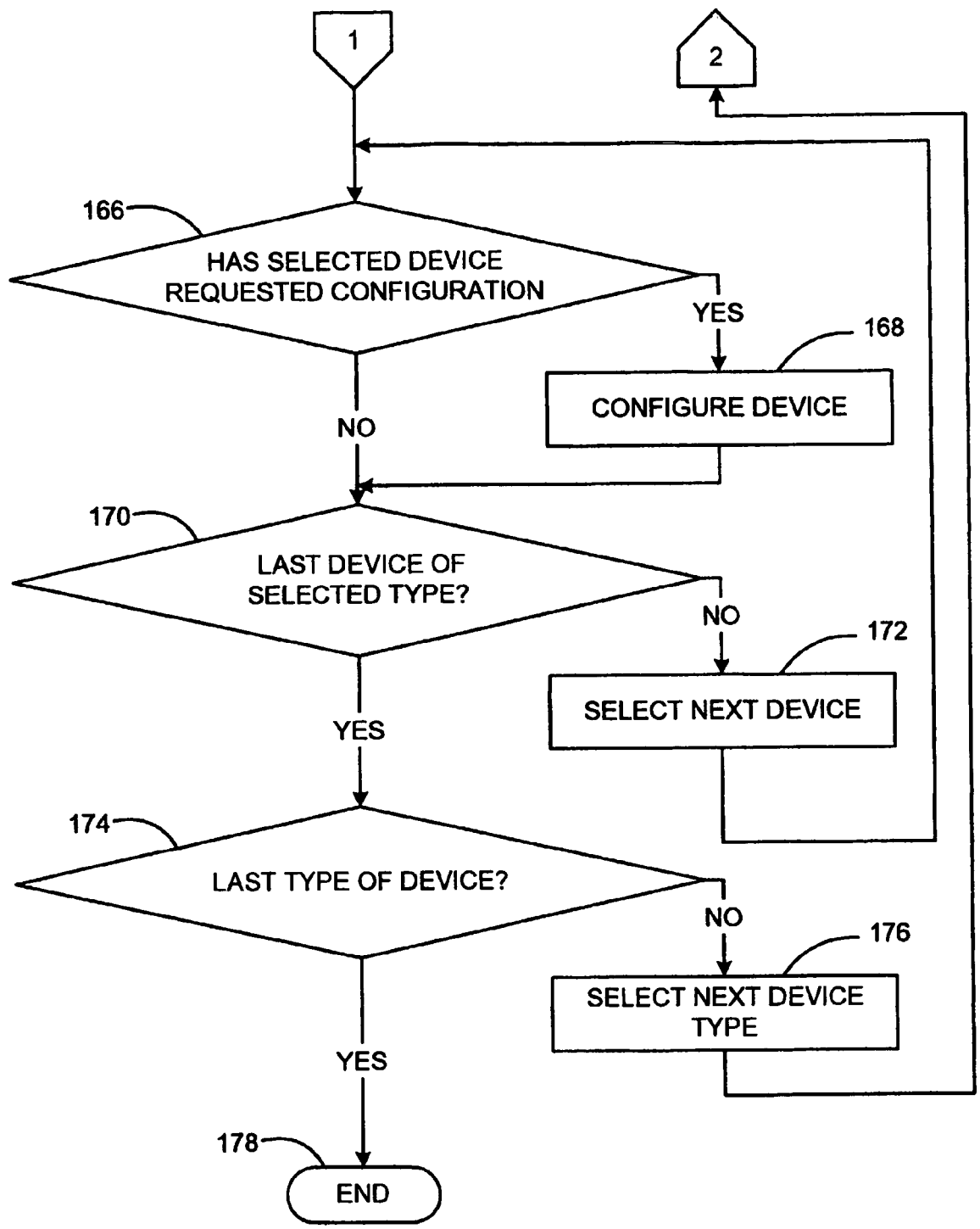

Referring next to FIG. 4, the method by which plural configurable devices, for example, the FPGAs 142-1 through 142-M, residing on plural cards, here, the output cards 138-1 through 138-M are configured using a shared configuration information repository, specifically, the configuration information maintained in the memory 146, will now be described in greater detail. Prior to further disclosing the foregoing, however, it should be noted that the present invention may be used in various configuration techniques. One such technique relates to the configuration of plural devices of a common device type. In such a technique, a single configuration file, for example, the FPGA configuration file 149-1, would be maintained in the memory 146. This technique is deemed particularly advantageous in that a single configuration file may be used to configure multiple programmable devices. Another technique relates to the configuration of plural programmable devices of different device types. In such a technique, plural configuration files, for example, the first, second and third configuration files 149-1, 149-2 and 149-3 must be maintained in the memory 146.

Prior to further description of these techniques, a further explanation of the present usage of the term "different types" in connection with the phrase "different types of programmable devices" should be presented. More specifically, in addition to the commonly understood usage thereof, as used herein, the phrase "different types" of programmable devices is also intended to encompass programmable devices of the same physical type if such devices require different configuration information. For example, to configure an FPGA residing on an input card may require a first set of instructions while to configure an FPGA residing on a router card may require a second set of instructions different from the first set of instructions. If so, the FPGA residing on the input card is considered to be a different type of programmable device with respect to the FPGA residing on the router card. Conversely, any two programmable devices which can be configured using the same set of instructions are considered to be the same type of programmable device, whether or not they are physically the same.

The method of configuring plural programmable devices of the same type will now be described with respect to FIG. 4. The method starts at step 150 and, at step 152, a programmable device, for example, the FPGA 142-1, issues a request for configuration to the peripheral controller which resides with the requesting configurable device on a common board, here, the peripheral controller 144-1 which resides, with the FPGA 142-1 on the output card 138-1. The issuance of a request for configuration may be triggered by a variety of events. For example, powering the FPGA 142-1, either by insertion of the output card 138-1 into a slot (not shown) of the input/output (or "I/O") bus of the first broadcast router component 102 or by a power-up of the first broadcast router component 102 itself would cause the FPGA 142-1 to issue a request for configuration. In turn, the peripheral controller, here, the peripheral controller 144-1, receiving the request for configuration would forward the request to the main controller 148, which receives the request for configuration at step 154. Of course, if the functionality residing in the peripheral controller 144-1 was instead residing in the FPGA 142-1, the FPGA 142-1 would issue the aforementioned request for configuration directly to the main controller 148.

Upon the main controller 148 detecting the arrival of the request for configuration at step 154, the method proceeds to step 156 where the main controller 148 will await the arrival of additional requests for configuration for a pre-selected time period. For example, if the issuance of the detected request for configuration was triggered by a power-up of the first broadcast router component 102, it is contemplated that requests for configuration for FPGAs residing on cards similarly configured to the output card 138-1 would arrive shortly thereafter the detected request for configuration issued by the FPGA 142-1. Proceeding on to step 158, if the pre-selected time period during which the main controller 148 will await the arrival of additional requests for configuration has not yet expired, the method returns to step 156 to await additional requests for configuration. If, however, it is determined at step 158 that the pre-selected time period has expired, the method proceeds to step 160 where the main controller 148 begins configuration of the programmable devices requesting configuration.

As there is only one type of device to be configured, from step 160, the method proceeds to step 164 where the main controller 148 begins checking the programmable devices coupled thereto to identify which of the programmable devices had requested configuration. To do so, at step 164, the main controller 148 selects, from the various programmable devices coupled thereto, a first programmable device. For example, the main controller 148 may select the FPGA 142-1. Of course, as all of the programmable devices coupled to the main controller 148 are the same type, the main controller 148 need not give any consideration to the type of the programmable device being selected. The method then proceeds to step 166 where the main controller 148 polls the peripheral controller, here, the peripheral controller 144-1, coupled to the selected programmable device, here, the FPGA 142-1, to determine if the selected programmable device had requested configuration. If the main controller 148 determines, at step 166, that the polled peripheral controller had issued a request for configuration on behalf of the selected programmable device, the method proceeds to step 168 where the main controller 148 configures the selected programmable device. To do so, the main controller 148 retrieves the configuration information maintained in the first area 149-1 of the memory 146 and forwards the retrieved configuration information to the peripheral controller 144-1. Using the received configuration information, the peripheral controller 144-1 then attends to the configuration of the FPGA 142-1 in conventional fashion. Of course, if the functionality residing in the peripheral controller 144-1 was instead residing in the FPGA 142-1, the main controller would poll the FPGA 142-1 directly to determine if the FPGA 142-1 had requested configuration. If so, the main controller 148 would subsequently forward the retrieved configuration information to the FPGA 142-1.

Upon completing configuration of the FPGA 142-1 at step 168, or upon determining at step 166 that the FPGA 142-1 had never issued a request for configuration, the method proceeds to step 170. At step 170, it is determined if there are additional programmable devices which need to be checked as to whether they had issued a request for configuration. If there are additional programmable devices to be checked, the method proceeds to step 172 where a next programmable device is selected. The method then returns to step 166 for further processing in the manner previously described. If, however, it is determined at step 172, that all of the programmable devices have been polled to determine if they had issued a request for configuration, the method would then proceed to step 178 where it ends.

Returning again to FIG. 4, the method of configuring programmable devices in a system having plural cards on which programmable devices of plural types reside, again, using a shared configuration information repository will now be described in greater detail. As before, the method starts at step 150 and, at step 152, a programmable device, again, for example, the FPGA 142-1, issues a request for configuration to the peripheral controller which resides with the requesting configurable device on a common board, here, again, the peripheral controller 144-1 which resides, with the FPGA 142-1 on the output card 138-1. In turn, the peripheral controller, here, the peripheral controller 144-1, receiving the request for configuration would forward the request to the main controller 148, which receives the request for configuration at step 154. Of course, if the functionality residing in the peripheral controller 144-1 was instead residing in the FPGA 142-1, the FPGA 142-1 would issue the aforementioned request for configuration directly to the main controller 148.

Upon the main controller 148 detecting the arrival of the request for configuration at step 154, the method proceeds to step 156 where the main controller 148 will await the arrival of additional requests for configuration for a pre-selected time period. Proceeding on to step 158, if the pre-selected time period during which the main controller 148 will await the arrival of additional requests for configuration has not yet expired, the method returns to step 156 to await additional requests for configuration. If, however, it is determined at step 158 that the pre-selected time period has expired, the method proceeds to step 160 where the main controller 148 begins configuration of the programmable devices requesting configuration.

As, in this embodiment of the invention, there may be plural types of programmable devices requesting configuration, at step 162, the main controller 148 selects a first type of programmable device to configure. It is contemplated that the particular type of device selected at step 162 may be determined using various techniques. For example, the type of device for which the initial request for configuration was detected at step 154 may be the type of device selected at step 162. In accordance with this technique, upon receipt of additional requests for configuration, the main controller 148 should check each request for configuration received thereby for device type and maintain a list of all types of devices for which at least one request for configuration was received prior to expiration of the pre-selected time period. Proceeding on to step 164, the main controller 148 begins checking the programmable devices to see if they had requested configuration. Again, the process by which the main controller 148 checks the programmable devices to determine if they had requested configuration may be readily varied. For example, the main controller 148 may poll each peripheral controller associated with a programmable device to determine whether: (1) the associated programmable device is of the selected device type; and (2) the peripheral controller had issued a request for configuration on behalf of the programmable device. Of course, if the functionality residing in the peripheral controllers was instead residing in the corresponding programmable devices, the main controller would directly poll each programmable device to determine whether: (1) the programmable device is of the selected device type; and (2) the programmable device had issued a request for configuration. the main controller would poll the FPGA 142-1 directly to determine if the FPGA 142-1 had requested configuration.

If the main controller 148 determines, at step 166, that the polled peripheral controller had issued a request for configuration on behalf of the selected programmable device and that the selected programmable device is of the selected type, the method proceeds to step 168 where the main controller 148 configures the selected programmable device. To do so, the main controller retrieves the configuration information maintained in that area of the memory 146 which maintains configuration information for the requesting type of programmable device and forwards the retrieved configuration information to the peripheral controller 144-1. Using the received configuration information, the peripheral controller 144-1 then attends to the configuration of the FPGA 142-1 in conventional fashion. Of course, if the functionality residing in the peripheral controller was instead residing in the selected programmable device, at step 166, the main controller 148 would instead determine whether the selected programmable device had issued a request for configuration and is of the selected type and, at step 168, the main controller 148 would forward the retrieved configuration information to the FPGA 142-1.

Upon completing configuration of the FPGA 142-1 at step 168, or upon determining at step 166 that the FPGA 142-1 had never issued a request for configuration, the method proceeds to step 170. At step 170, it is determined if there are additional programmable devices which need to be checked as to whether they had issued a request for configuration and are of the selected type of programmable device. If there are additional programmable devices to be checked, the method proceeds to step 172 where a next programmable device is selected. The method then returns to step 166 for further processing in the manner previously described. If, however, it is determined at step 172, that all of the programmable devices have been polled to determine if they had issued a request for configuration and are of the selected type of programmable device, the method would then proceed to step 174 where the main controller 148 determines whether there are additional types of programmable devices which had requested configuration. For example, the main controller 148 may check the list of types of programmable devices requesting configuration to see if there are additional types of programmable devices which had not yet been configured. If there are additional types of programmable devices which need to be configured, the method proceeds to step 176 where the main controller 148 selects a next type of programmable device for configuration. The method then return to step 164 for further processing in the manner previously described. If, however, it is determined at step 174 that all of the types of programmable devices requesting configuration had been configured, the method would end at step 178.

Of course, there are a number of methods of practicing the embodiment of the invention in which plural types of programmable devices are configured using a shared configuration information repository which would not require the main controller 148 to either maintain a list of types of programmable devices requesting configuration or to poll each of the programmable devices once for each type of programmable device which had requested configuration. In this method, after beginning configuration of the requesting programmable devices at step, the main controller 148 would poll a selected peripheral controller if the programmable device associated therewith had requested configuration. If the peripheral controller indicates that the programmable device had requested configuration, the main controller 148 would inquire as to the type of programmable device which is associated with the peripheral controller. Using this information, the main controller 148 may retrieve the appropriate configuration information from the memory 146 and proceed with configuration of the programmable device as previously described. The main controller 148 would then selected a next programmable device and repeat the process until all of the programmable devices have been polled to determine if they had requested configuration and, if so, have been configured. It should be appreciated that the foregoing method both reduces the number of passes that the main controller 148 must make to configure all of the requesting programmable devices. The foregoing method also eliminates any need for the main controller 148 to maintain a list of types of programmable devices requesting configuration.

Thus, there has been disclosed and illustrated herein a broadcast router having a shared configuration information repository used to configure plural programmable devices, each located on a different board within the broadcast router. The shared configuration information repository may be used to configure plural programmable devices, each located on a different board of the same board type or may be used to configure plural programmable devices, each located on a different board of a different board type. By configuring the broadcast router in this manner, considerable savings of memory resources is achieved by the elimination of the requirement of a discrete memory device for each programmable device.

Of course, while preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. An electronic system, comprising:
    a plurality of function cards including at least one router card, a plurality of input cards and a plurality of output cards, each having at least one programmable device residing thereon;
    a configuration control card coupled to each one of said plurality of function cards, wherein said configuration control card configures said at least one programmable device residing on each one of said plurality of function cards in response to a request for hardware configuration, wherein said configuration control card comprises a main controller;
    a memory subsystem residing on said configuration control card, wherein said configuration control card configures said at least one programmable device residing on each one of said plurality of function cards using configuration information stored in said memory subsystem; wherein said main controller is coupled to said memory subsystem; said main controller configuring each one of said plurality of function cards using said configuration information stored in said memory subsystem; and
    a peripheral controller residing on each one of said plurality of function cards, wherein said main controller is coupled to said plurality of function cards via the peripheral controller associated with each function card of the plurality of function cards;
    each one of said peripheral controllers attending to:
    (1) forwarding the requests for configuration, originated by said programmable device residing with said peripheral controller on one of said function cards, to said main controller; and
    (2) attending to forwarding configuration information, provided by said main controller to said programmable device residing with said peripheral controller on one of said function cards.

2. The apparatus of claim 1, wherein each one of said at least one programmable device residing on each one of said plurality of function cards is a field programmable gate array ("FPGA").

3. The apparatus of claim 1, wherein said plurality of function cards further comprises:
    a plurality of function cards of a first type, said first type of function cards requiring a first set of instructions for configuration thereof;
    a plurality of function cards of a second type, said second type of function cards requiring a second set of instructions for configuration thereof;
    said first set of instructions stored in a first area of said memory subsystem and said second set of instructions stored in a second area of said memory subsystem;
    wherein said configuration control card configures said plurality of function cards of said first type using said first set of instructions stored in said first area of said memory subsystem and said configuration control card configures said plurality of function cards of said second type using said second set of instructions stored in said second area of said memory subsystem.

4. The apparatus of claim 3, wherein said configuration control card further comprises:
    a main controller coupled to said memory subsystem, said plurality of function cards of said first type and said plurality of function cards of said second type;
    said main controller configuring each one of said plurality of function cards of said first type using said first set of instructions stored in said first area of said memory subsystem; and
    said configuration control card configuring each one of said plurality of function cards of said second type using said second set of instructions stored in said second area of said memory subsystem.

5. The apparatus of claim 4, wherein each one of said programmable devices residing on each one of said plurality of input cards, said first router card, and each one plurality of output cards is a field programmable gate array ("FPGA").

6. The apparatus of claim 5, wherein said configuration control card further comprises:

a memory subsystem, said memory subsystem including a first memory area, a second memory area and a third memory area;

a main controller coupled to said memory subsystem, each one of said plurality of input cards, said first router card, and said plurality of output cards;

said main controller configuring said at least one FPGA of each one of said plurality of input cards using a first set of instructions stored in said first area of said memory subsystem, configuring said at least one FPGA of said first router card using a second set of instructions stored in said second area of said memory subsystem and configuring said at least one FPGA, of each one of said plurality of output cards using a third set of instructions stored in said third area of said memory subsystem.

7. The apparatus of claim 6, and further comprising:

a second router card having an input side, an output side and at least one FPGA residing thereon;

each one of said plurality of input cards further coupled to said input side of said second router card;

each one of said plurality of output cards further coupled to said output side of said second router card;

said main controller configuring said at least one FPGA of said second router card using said second set of instructions stored in said second area of said memory subsystem.

8. The apparatus of claim 7, and further comprising:

a peripheral controller residing on each one of said plurality of input cards, said first and second router cards and each one of said phirality of output router cards;

each one of said peripheral controllers attending to forwarding requests for configuration, originated by said FPGA residing with said peripheral controller on one of said plurality of input cards, said first router card, said second router cards or one of said output cards, to said main controller; and each one of said peripheral controller further attending to forwarding configuration information, provided by said main controller, to said FPGA residing with said peripheral controller on one of said input cards, said first router card, said second router card or one of said output cards.

9. A broadcast router, comprising:

a first router card having an input side, an output side and at least one programmable device residing thereon;

a plurality of input cards, each one of said plurality of input cards coupled to said input side of said router card and having at least one programmable device residing thereon;

a plurality of output cards, each one of said plurality of output cards coupled to said output side of said router card and having at least one programmable device residing thereon; and a configuration control card coupled to said router card, each one of said plurality of input cards and each one of said plurality of output cards, said configuration control card configuring said at least one programmable device residing on said router card, each one of said plurality of input cards and each one of said plurality of output cards, in response to a hardware configuration request a memory subsystem residing on said configuration control card, said memory subsystem a first memory area, a memory area and a third memory area;

wherein said configuration control card configures said at least one programmable device residing on each one of said plurality of input cards using hardware configuration information stored in said first area of said memory subsystem, configures said at least one programmable device-residing on said first router card using hardware configuration information stored in said second area of said memory subsystem, and configures said at least one programmable device residing on each one of said plurality of output cards using hardware configuration information stored in said third area of said memory subsystem.

10. The apparatus of claim 9, and further comprising:

a second router card having an input side, an output side and at least one programmable device residing thereon;

each one of said plurality of input cards further coupled to said input side of said second router card;

each one of said plurality of output cards further coupled to said output side of said second router card;

said configuration card further configuring said at least one programmable device residing on said second router card.

* * * * *